United States Patent
Gerhart

(10) Patent No.: US 6,766,388 B2
(45) Date of Patent: Jul. 20, 2004

(54) METHOD FOR DETERMINING A HOST DATA TRANSFER GOAL IN A HARD DISK DRIVE SYSTEM

(75) Inventor: Darin Edward Gerhart, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 246 days.

(21) Appl. No.: 09/917,496

(22) Filed: Jul. 27, 2001

(65) Prior Publication Data

US 2003/0023790 A1 Jan. 30, 2003

(51) Int. Cl.[7] .................................................. G06F 3/00
(52) U.S. Cl. ............................. 710/58; 710/29; 710/60
(58) Field of Search .............................. 710/22, 60, 56, 710/29, 58, 52, 53, 54

(56) References Cited

U.S. PATENT DOCUMENTS

| | | |
|---|---|---|
| 5,210,829 A | 5/1993 | Bitner |
| 5,812,754 A | 9/1998 | Lui et al. |
| 5,978,868 A | 11/1999 | Maas |
| 6,000,020 A | 12/1999 | Chin et al. |
| 6,057,863 A | 5/2000 | Olarig |
| 6,092,128 A | 7/2000 | Maas et al. |

OTHER PUBLICATIONS

Patent Application Ser. No. 09/816,161, "Method for Dynamically Adjusting Buffer Utilization Ratios in a Hard Disk Drive System," Darin Edward Gerhart, filed Mar. 23, 2001.

*Primary Examiner*—Jeffrey Gaffin
*Assistant Examiner*—Alan Chen
(74) *Attorney, Agent, or Firm*—James R. Nock

(57) ABSTRACT

A method, which may be embodied upon a computer readable medium and executed by a processor, for dynamically adjusting buffer utilization ratios for a hard disk drive system. The method establishes and dynamically adjusts a host transfer goal, which targets the amount of data transferred between host catch-up conditions for a current command. The actual amount of data transferred between host catch-up conditions is compared against the host transfer goal, and the buffer utilization ratios are adjusted when the actual amount of transferred data does not exceed the transfer goal. The host transfer goal is established by a number of operational characteristics, including drive transfer speed, host transfer speed, and track switch locations.

6 Claims, 11 Drawing Sheets

Figure 2: Drive Data Transfer Over Time

Figure 3: Host Data Transfer Over Time

METHOD FOR DETERMINING A HOST DATA TRANSFER GOAL IN A HARD DISK DRIVE SYSTEM

RELATED CO-PENDING APPLICATIONS

The present invention is related to co-pending U.S. patent application Ser. No. 09/816,161, filed Mar. 23, 2001, entitled "Method for Dynamically Adjusting Buffer Utilization Ratios in a Hard Disk Drive System". The present invention and the copending application have the same inventor, and share a common assignee.

FIELD OF THE INVENTION

The present invention relates to data transfer in a hard disk drive system, and more specifically to the dynamic adjustment of buffer utilization ratios within the hard disk drive and monitoring thereof.

BACKGROUND OF THE RELATED ART

Conventional hard disk drives generally include two individual data transfer engines configured to cooperatively move data into and out of a hard disk drive storage medium, as shown in FIG. 1. The first of the two engines, typically referred to as the drive side engine 101, is generally responsible for transferring data between a memory buffer 102, which may be a bank of dynamic random access memory (DRAM), and the magnetic media 100 of the hard disk drive. The second of the two engines, typically referred to as the host side engine 103, is responsible for transferring data between the memory buffer 102 and a host interface 104. The host interface 104 may be, for example, an advanced technology attachment interface (ATA), a small computer systems interface (SCSI and/or scuzzy), fiber channel arbitrated loop (FC-AL), and/or another known interface configurations. The first and second engines generally operate independently of each other, but often operate to transfer data into and out of the memory buffer 102 simultaneously. Additionally, the first and second engines often operate at different data transfer speeds, as host-type interfaces often operate in the 1 to 2 gigabit per second (Gbps) range, while the interface between a hard disk drive and a memory are traditionally much slower, generally in the range of 20 to 60 megabytes per second (Mb/s).

In an operation to read data from the hard disk drive, for example, when a device requests information residing on the hard disk drive, the drive side engine 101 generally operates to transfer the requested data from the storage medium 100 of the hard disk drive to the memory buffer 102. After a predetermined period of time has passed, the host engine 103 will generally begin moving data transferred to the memory buffer 102 by the drive side engine 101 to the host interface 104 for distribution to the device requesting the data from the hard disk drive. It is important that the host side wait before initiating data transfer, as the host side is generally capable of transferring data at a substantially faster rate. Therefore, the host is capable of rapidly catching up to the drive side, which results in loop performance delays due to re-arbitration, as the host side engine must then be temporarily disabled in order to allow the drive side transfer more data for the host side to process/transfer. After the drive side initiates data transfer, it will eventually complete the transfer of the requested information from the medium of the hard disk drive to the memory buffer. At some time after drive side engine initiates data transfer, host side engine starts transfer and eventually completes transfer of the requested data from the memory buffer to the host interface.

Once the host side engine completes the transfer of data from the memory buffer to the host interface, the data transfer process for that particular read operation is generally complete. However, in a typical hard disk drive configuration, there are generally multiple individual chunks of data transferred in order to complete a single transfer command, and therefore, the host side may regularly catch up to the drive side at the end of each data segment transfer. These end of segment-type catch-up conditions may generally be referred to as desired catch-up conditions, and are expected to continue until the segments are collectively transferred, thus completing the individual transfer command.

A similar operation is conducted for writing data to the hard disk drive, however, the data flow and respective engine handling is essentially reversed. Therefore, when a device is to write data to the hard disk drive, the host side engine generally begins to transfer the portion of data to the memory buffer from the host interface, for example, a segment of data. The memory buffer will begin to fill up with the data to be written, and therefore, at some predetermined time thereafter, which is generally as quickly as possible, the drive side engine begins to transfer data into the drive storage medium for storage thereon. Both engines may simultaneously transfer data to and from the memory buffer until the data is completely transferred to the hard disk drive. This simultaneous transfer operation generally occurs in segments or blocks, in similar fashion to the above noted read operation. However, drive side catch-up conditions are generally much less frequent than host side catch-up conditions, as the performance penalty associated with a drive side catch-up is substantially greater than a host side, and is therefore to be avoided. In this configuration the host side engine generally completes data transfer operations prior to the data side engine.

However, since the drive and host side engines generally operate at different data transfer rates, one engine may "catch-up" to the other engine during a data transfer operation, irrespective of the direction of the data transfer. In this situation, the transfer operations of engine that has caught up must be halted, and the engine must wait until the other engine has transferred additional data, i.e., caught up, before the halted engine can reinitiate and continue its own data transfer operations. If the host side engine catches up to the drive side engine, then the catch-up condition is generally referred to as a host catch-up. Alternatively, if the drive side engine catches up to the host side engine, then the catch up condition is generally referred to as a drive catch-up. Both of these conditions are detrimental to the efficiency and performance of the hard disk drive and the surrounding components/devices, as each time a catch-up event occurs, an efficiency/performance penalty is incurred, as the respective engine is halted while the software intervenes to calculate when the engine may be subsequently restarted.

On hard disk drives in particular, drive catch-up conditions have a substantial performance penalty, as it requires one complete revolution of the hard disk storage medium before access to the storage medium may be reinitiated at the same location at which the previous data read/write was stopped. For example, on a 10,000 revolution per minute disk drive, the timing penalty for waiting for the drive medium to complete a single revolution to return to the point on the drive at which the drive medium was halted would be at least 6 milliseconds. Although host catch-up penalties are typically smaller than drive catch-up penalties and depend primarily upon the specific type of interface used, host catch-up penalties nevertheless also contribute to decreased system performance. In a fiber channel arbitrated loop configuration (FC-AL), for example, the halt/wait time penalty generally amounts to the time required to re-arbitrate for the loop. However, on large loops or public loops, the wait time penalty can be significantly increased and become a substantial factor in decreased system performance. Both types of catch-up conditions generally require software intervention to halt and/or reinitiate the respective transfer engine. As a result thereof, both catch-up conditions require allocation of valuable processor cycles, which reduces the number of processor cycles available for other devices and tasks, such as, for example, command reordering.

In view of the performance degradation resulting from catch-up conditions, it is desirable to have a logical structure and/or controlling-type software for hard disk drives that is configured to avoid catch-up conditions and to optimize the host side engine usage so as to reduce the number of times it must be re-started. Some conventional scuzzy-type (SCSI) devices attempt to accomplish this task via allowing users selective control over when the host side engine initiates data transfer. This selective control is generally based upon timing of the host engine's initialization of data transfer with respect to the drive side engine. This timing is generally based upon the size of the intermediately positioned memory buffer and the transfer speeds of the respective engines. In particular, conventional devices may allow users to set the Read Full Ratio in Mode Page 2 for read commands. This ratio generally represents a fraction that indicates how full the drive buffer should be before host data starts getting transferred out of the buffer, i.e., 40% or 80%, for example. There is also a corresponding Write Empty Ratio parameter, which represents how empty the buffer should be before the drive engine should request more data to be written thereto, that can be specified for write commands. These are fixed ratios that a sophisticated customer may be able to use in order to maximize loop performance for case specific tasks under very specific conditions. However, the manipulation of these parameters requires that the user have substantial understanding of the respective system and that the respective system has a predictable and relatively constant loop response. However, if system conditions change, as they often do, then the fixed ratios are no longer appropriate and must be recalculated by the user, which may be a substantial task. As an alternative to manually manipulating these parameters, the user may allow the hard disk drive to determine when to start the host side engine in reference to the drive side engine by setting one or both of the Read Full Ratio and Write Empty Ratio to zero. This is generally referred to in the art as using an "adaptive ratio," which indicates that a consistent value is used to adjust the engine start times. This value remains constant during operation and is not adjusted for system changes.

For example, an SCSI interface utilizes an inter-locked bus design that allows for a relatively high degree of predictability on data transfers. In particular, once a device on an SCSI interface arbitrates and gains control of the bus, data may be instantaneously transferred from one device to the other device. Therefore, generally the only variable that needs to be considered when calculating the optimal time to start the host engine on a transfer, e.g., the adaptive ratios, aside from the respective engine speeds, is the amount of time it takes to gain control of the bus. Therefore, using a worst case bus workload scenario, the amount of time required to gain control of the bus can be calculated and used to represent all other workload cases. This amount of time is relatively constant and with minimal padding can be set so as to generally avoid a drive catch-up condition, while also minimizing the number of host catch-ups conditions. Since the calculated worst-case time to gain control of the bus generally remains constant for writes or reads and generally does not vary from system to system, this approach is generally effective for SCSI based devices.

Alternatively, FC-AL interfaces have a number of variables that contribute to the calculation of the adaptive ratio. As such, FC-AL interfaces are substantially less predictable than SCSI interfaces. For example, on an FC-AL loop, the ability to arbitrate for control of the loop generally depends upon factors such as the loop traffic and the number of ports present on the loop. Therefore, on a busy loop with a large number of ports, the delay required to arbitrate for control of the bus could easily be several milliseconds. Additionally, in an FC-AL configuration data is not instantaneously transferred between devices on a loop, as there is some finite delay between the time when one device sends data and another device actually receives the data. This delay generally increases as the loop size grows, and therefore, increases substantially if there is an interstitially positioned fabric. Furthermore, FC-AL includes unique handling procedures for write data, as the drive sends a Transfer Ready frame when it is ready to begin receiving write data frames. The drive, however, has no control over when the receiver of the Transfer Ready frame will turn around and begin sending these data frames. This turn around time varies from adaptor to adaptor and from system to system, and therefore, further contributes to making it increasingly difficult to calculate the adaptive ratios for an FC-AL type system.

Another major problem in calculating the adaptive ratios is the fact that the data transferred by both the drive engine and the host engine is not a perfectly linear function. If the drive and host transfers were linear functions, the system would be quite predictable and calculating an optimal buffer ration would be simplified. However, both transfers consist of a combination of linear and step functions which complicates the problem.

The drive engine transfers data into (or out of) the buffer in a nearly linear fashion until it reaches the end of a track. At that point, a track switch occurs which injects a step function delay into the drive data transfer. During the track switch, no data is actively being transferred into (or out of) the buffer from the drive engine. This delay is quite significant and can require up to one-third of a revolution to complete. However, the track switch delay is known and fixed. Assuming no servo or drive errors, the drive data transfer function consistently behaves according to a function similar to the one shown in FIG. 2.

Similarly, the host transfer consists of a combination of a step function and a linear function. The host engine encounters a step function as it is attempting to arbitrate the loop. Once it has control of the ioop, the data transfer typically behaves nearly linearly. However, for the host transfer, the problem exists in that the step function delay varies depending on a number of factors outlined below.

The first factor is the loop traffic. As loop traffic increases, the delay to win arbitration also increases. A second factor is physical loop size and topology. FC-AL allows up to 128 ports on a loop. Each port inherently injects some propagation delay into the loop. As the number of ports increases, so does the total loop propagation delay and hence the amount of time to win arbitration. A third factor is the workload type. In SCSI-FCP, reads and writes behave quite differently. A drive only needs to win arbitration once on reads to begin a host data transfer. On writes, a drive must first win arbitration and send a XFER_RDY frame to the initiator indicating how much data the drive is ready to receive. Typically the drive closes the connection at this point. Then, the initiator must win arbitration before the host data transfer can begin. As a result of this extra step, writes incur an additional delay over read commands before the data transfer actually begins. A fourth factor is the type of host system. Some host systems are faster and have larger buffers than others, which results in a variation in system behavior. The amount of time required to process an XFER_RDY frame and begin sending write data varies from system to system. Some systems can keep up with sequential read data streaming from the drive. Others will CLS the connection or temporarily withhold credit when they have exhausted their resources. Other system variations that can affect delays include command turnaround time, queue depth, and transfer length. These system variations translate to delays that the drive firmware must account for to efficiently complete host transfers. The fifth and final factor is host transfer speed. For example, arbitration delays on a 1 Gbps loop will inherently be twice as long as on a 2 Gbps loop. FIG. 3 illustrates how these variations in the arbitration delay can affect the host transfer.

This variation in host delays does affect the frequency of host catch-ups and drive catch-ups. How well this variation is accounted for in calculating buffer ratios is directly attributable to loop efficiency and overall drive performance. Previous designs used a simple table of constants (indexed by zone) to determine how much pad was needed to account for the arbitration delays. Such a static design has no ability to account for any variations in arbitration delays. It can be manually tuned to be efficient for one system and one workload. Moving the same drive to a different system or changing the workload can result in poor performance.

Co-pending application Ser. No. 09/818,161, filed Mar. 23, 2001 entitled "Method for Dynamically Adjusting Buffer Utilization Ratios in a Hard Disk Drive System", hereinafter incorporated by reference, provides on-the-fly tuning to account for these variations. This uses a pad to account for the delays encountered in the host transfer. The pad is adjusted to attempt to account for changes in host transfer delays and to maximize loop utilization efficiency. The larger the pad, the sooner the host side is started in reference to the drive side transfer, resulting in a smaller probability that a drive catch-up will occur. However, the larger the pad, the greater the number of host catch-ups that are needed to complete a given transfer. More host catch-ups result in more loop tenancies, which leads to more loop overhead and reduced system performance. The smaller the pad becomes, the fewer the number of host transfers that are required to complete a given transfer. However as the pad size is decreased, the risk of incurring a drive catch-up increases.

One of the pad adjustment mechanisms outlined in application Ser. No. 09/818,161 compares the actual amount of host data transferred since the previous host catch-up to a fixed threshold (i.e., goal) based on the drive's segment size. If the actual amount of data transferred exceeds the goal, no pad adjustments are made. If the amount of actual data transferred does not exceed the goal, the pad size is decreased by a predetermined, fixed amount to improve the probability that the host side exceeds the goal during the next transfer.

It would be desirable to provide a dynamic, more realistic goal to provide increased accuracy and adaptability in reaching an optimal pad setting. Rather than relying solely on a single fixed parameter (i.e., a drive's segment size), the goal would dynamically adjust, based on a number of factors including: drive transfer speed, host transfer speed, and track switch locations.

SUMMARY OF THE INVENTION

The present invention provides a method for dynamically adjusting buffer utilization ratios for a hard disk drive system. The method establishes and dynamically adjusts a host transfer goal, which targets the amount of data transferred between host catch-up conditions for a current command. The actual amount of data transferred between host catch-up conditions is compared against the host transfer goal, and the buffer utilization ratios are adjusted when the actual amount of transferred data does not exceed the transfer goal.

The host transfer goal is determined by a number of operational characteristics, including drive transfer speed, host transfer speed, and track switch locations. As these characteristics change during operation, the host transfer goal is adjusted accordingly, and the data transfer rate is optimized.

In one embodiment, the data transfer goal is established by first initializing a base block count for the current transfer operation, by analyzing both the host and drive transfer speeds. Next, the method iteratively calculates how many additional drive blocks are transferred while the host side is transferring. A data transfer goal is then established from the base block count and the additional drive blocks that are transferred while the host side is transferring. Finally, if a track switch occurs during the host side transfer, the data transfer goal is adjusted accordingly.

If the host side transfer cannot be completed in a single operation, the base block count is initialized to the size of the buffer minus the size of the pad. The pad is defined as an optimal point in time where the host engine should start/restart transferring read data so that the drive side engine does not stall and/or enter into a catch-up condition during the transfer of data into and out of the buffer. Otherwise, if the host side transfer can be completed in a single operation, the base block count is initialized to the remaining blocks in the transfer operation minus the number of drive blocks that will be transferred in the amount of time it takes the host side to complete the transfer for the current command.

The number of blocks the drive side transfers while the base block count is being transferred by the host is computed by multiplying the base block count by the drive data rate inverse, then dividing the product by the host data rate inverse.

BRIEF DESCRIPTION OF THE DRAWINGS

So that the manner in which the above recited features and embodiments are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

A general solution to the difficulties associated with dynamically calculating adaptive ratios for a hard disk drive resident in an FC-AL type interface is to dynamically maintain at least one variable that may be used to control memory buffer usage. A first dynamically adjusted variable may represent a number of memory blocks read into a memory buffer by a drive side engine compared to the number of memory blocks currently residing in the memory buffer designated for transfer by a host side. This variable, which may be termed a Read Buffer Pad, may therefore be used to determine an optimal point in time where the host engine should start/restart transferring read data so that the drive side engine does not stall and/or enter into a catch-up condition during the transfer of data into and out of the buffer. A second dynamically adjusted variable, which may be termed the Write Buffer Pad, may represent the difference between the number of memory blocks written into the memory buffer by the host side engine compared to the number of memory blocks remaining in the memory buffer designated for transfer by the drive side engine. This variable may be used to determine the optimal point at which the host side engine should request more data to be written in to the memory buffer so that the drive side engine does not enter into a catch-up condition. These two variables are generally needed since the time to restart the host side transfer for reads can be significantly less than the amount of time to request and receive data for writes.

Figure 1:
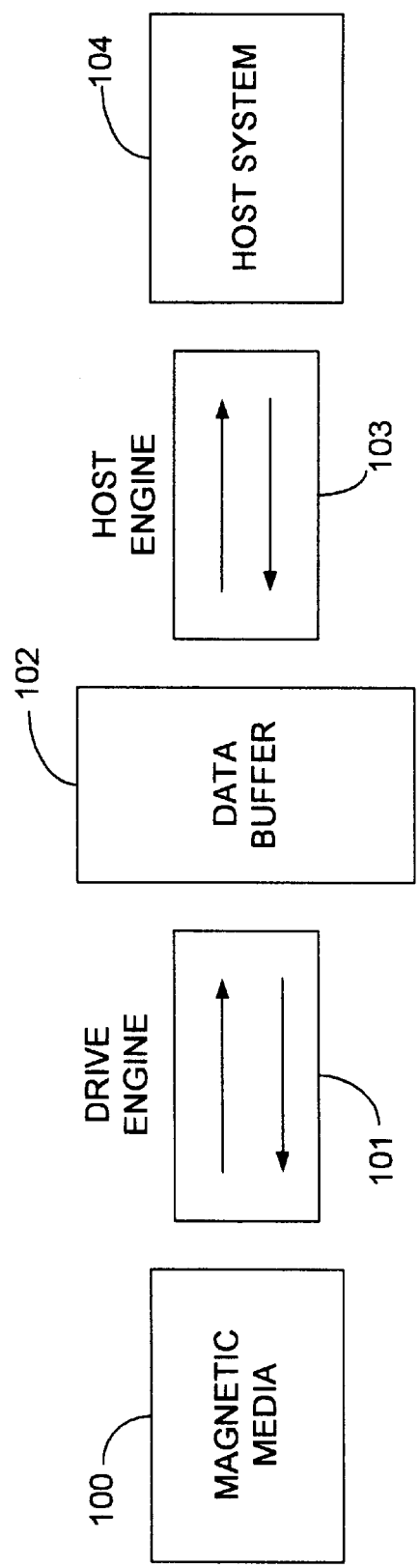
FIG. 1 illustrates a conventional hard disk drive engine configuration.
Figure 2:
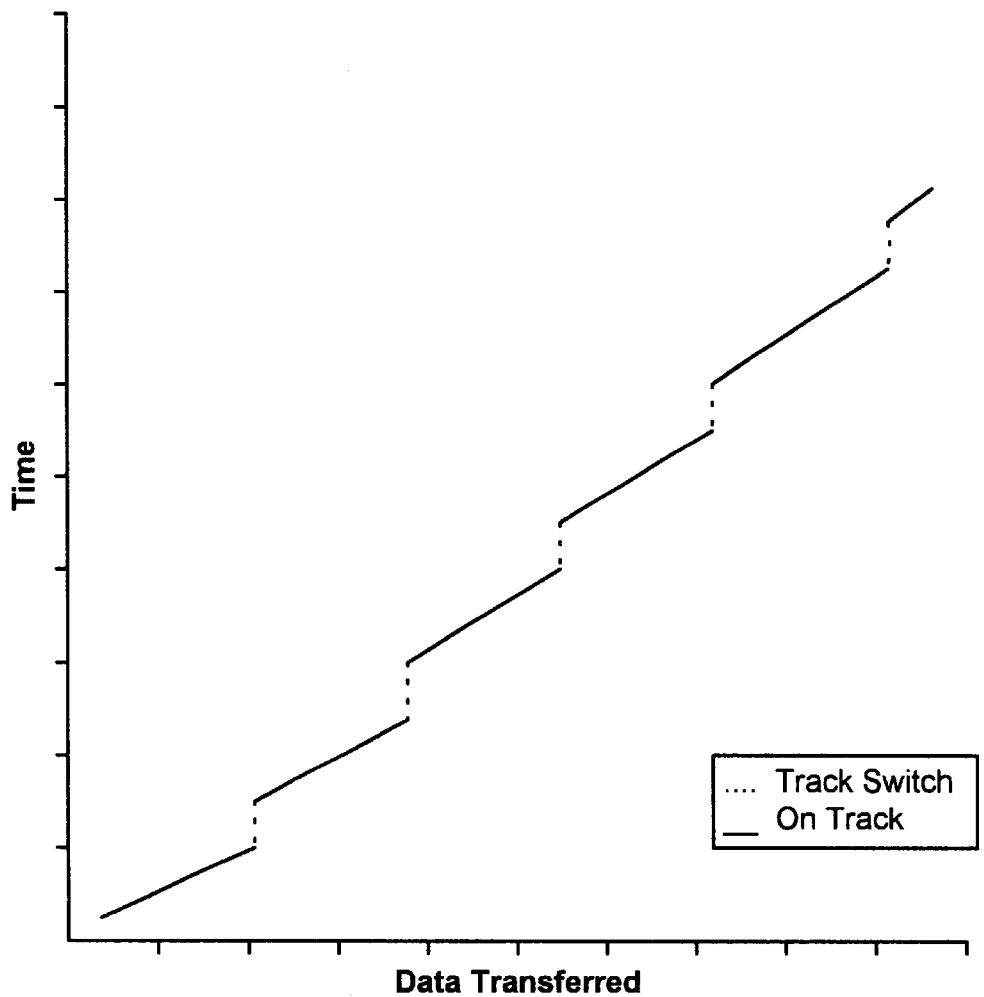
FIG. 2 illustrates a graph of a drive data transfer over time.
Figure 3:
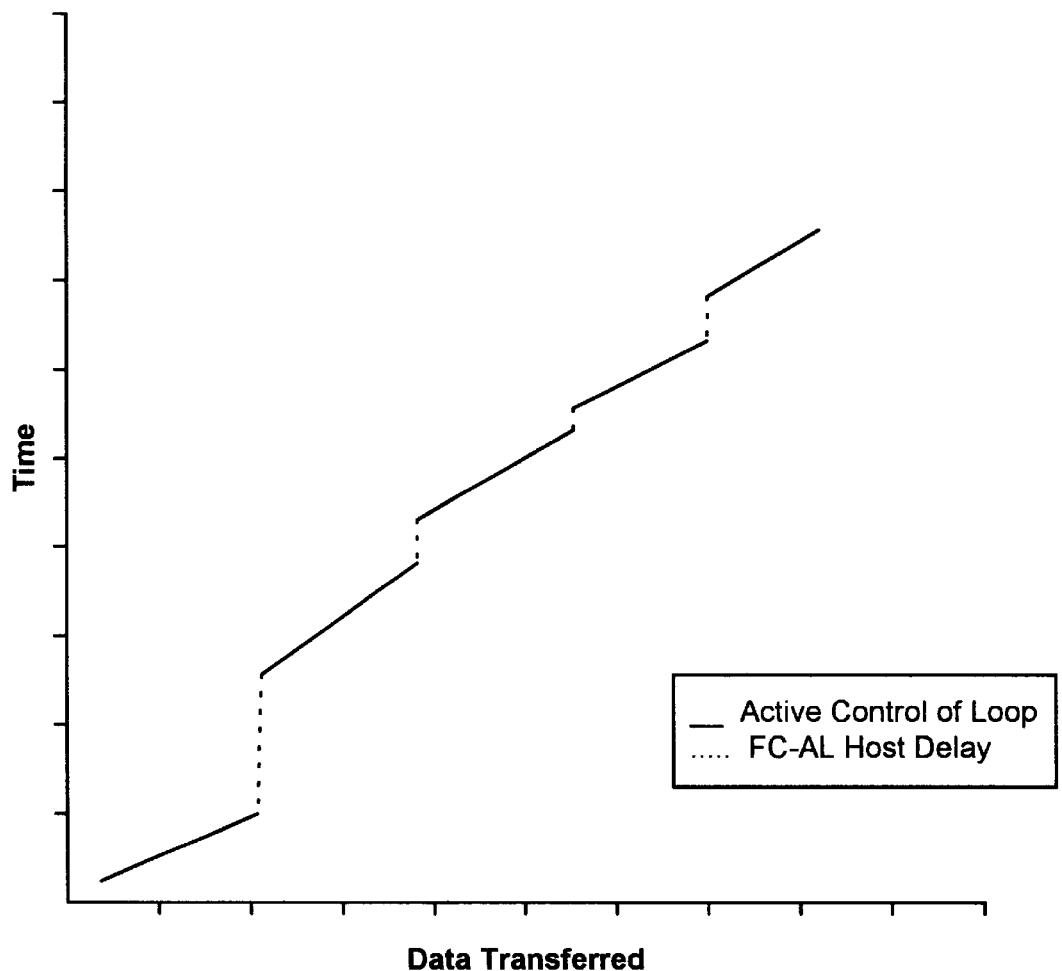
FIG. 3 illustrates a graph of a host data transfer over time.
Figure 4:
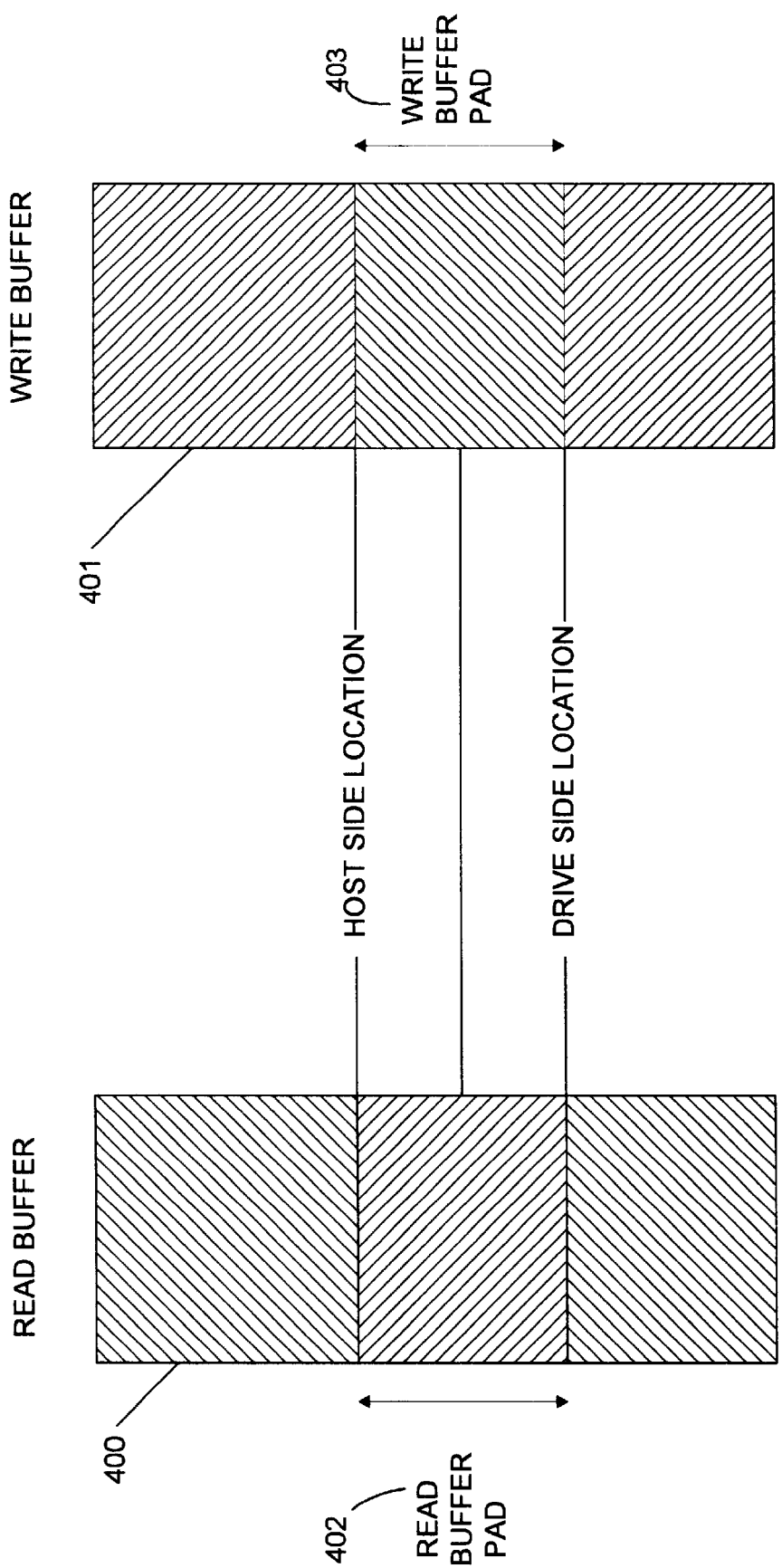
FIG. 4 illustrates exemplary buffers of the present invention.

The dynamic maintenance of the two variables may be configured so that the drive side engine does not stop transferring data until it has reached the end of the command, which will minimize drive side catch-ups. FIG. 4 is presented as an exemplary illustration of hard disk drive data buffers prior to a host side engine being re-started for both a Read command case and a Write command case. The exemplary illustration of FIG. 4 assumes that respective buffers wrap from top to bottom. Therefore, for a read command, FIG. 4 illustrates how the read buffer 400 will fill up with data from the media. At the point where the drive side reaches the read buffer pad delta 402 from the host side location, the host side should begin transferring data to the host system. For a write command case, FIG. 4 illustrates the drive side engine emptying the read buffer 401 as it writes data to the media. Therefore, at the point where the drive side reaches the write buffer pad delta 403 from the host side location, the host side should begin requesting more data to write from the host system.

The respective pads 402, 403 may be dynamically adjusted during read/write operations, wherein the adjustments may be based upon current drive state as well as the success or failure of the previous pad settings. In order to accomplish this type of dynamic adjustment taking into account previous statistical information, separate statistical counters, as are known in the art, may be used to track and/or record statistical information relative to the configuration. For example, the statistical counters may be used to track and/or record parameters such as the number of host-catch-ups and the number of drive catch-ups for both read and write operations, the number of times the host side engine begins a data transfer, along with various other FC-AL related parameters. Separate variables may also track/record the host side and drive side locations in the buffer during the previous catch-up condition.

Figure 5:
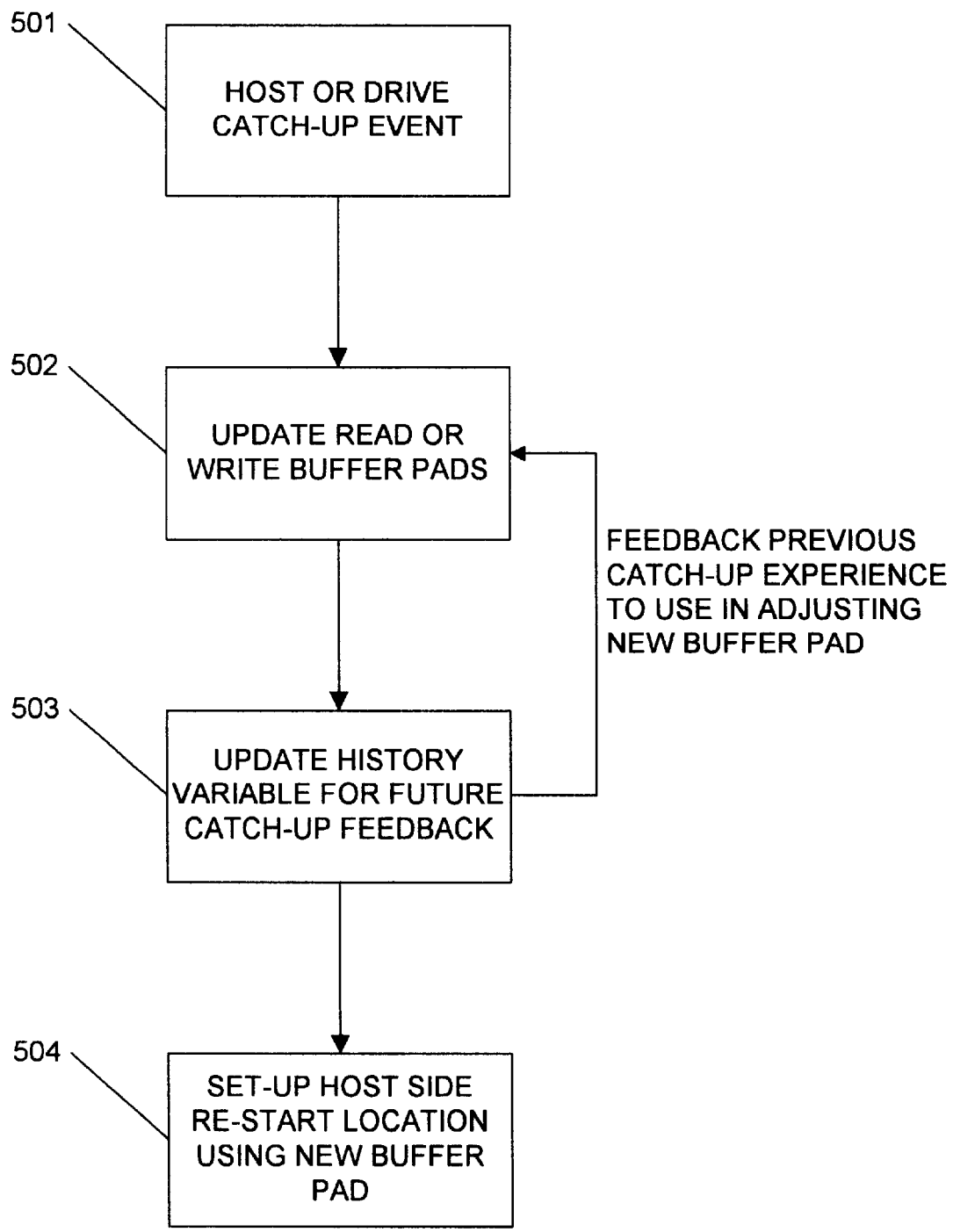
FIG. 5 illustrates an exemplary flow diagram of a control/adjustment process for adjusting buffer utilization ratios.

The dynamic adjustment of the Read Buffer Pad 402 and the Write Buffer Pad 403 will generally be conducted upon occurrence of catch-up condition. FIG. 5 illustrates a general flow diagram of how a control/adjustment process may utilize feedback from the previous history of catch-up events to adjust the current read/write buffer pads for optimal operation. The flow begins at step 501 when a catch-up event occurs in a hard disk drive. When the catch-up condition occurs, the control process updates the respective read and write buffer pads for operation that is calculated to avoid encountering a future catch-up condition under the circumstances that caused the present catch-up condition at step 502. The process is further configured to record the parameters and conditions of the hard disk drive system that caused the present catch-up condition at step 503. This information may be then be used in the updating process of step 502 upon encountering the next catch-up condition. Once the respective pads are updated, the process sets up the host side restart location using the updated pad at step 504.

Various algorithms may be implemented within step 502 of the process flow shown in FIG. 5 in order to update the respective buffer pads. For example, co-pending application Ser. No. 09/816,161 describes a simple algorithm for adjusting either the Read Buffer Pad or the Write Buffer Pad calculated to increase the appropriate pad by predetermined constant, i.e., 10 blocks, when a catch-up condition occurs. In this type of a configuration and implementation the adjustment constants may be weighted heavier for drive catch-up conditions than for host catch-up conditions due to the severity of the performance penalty for a write catch-up.

The present invention builds upon the simple algorithm described above (i.e., the algorithm of co-pending application Ser. No. 09/816,161) by outlining a mechanism for establishing the threshold/goal to be used in "grading" the outcome of a specific pad setting. In the simple algorithm described above, the threshold/goal was a fixed value based solely on the drive's segment size. In contrast, the present invention calculates a more realistic, dynamic threshold/goal based on the drive and host transfer speeds, and the track switch locations. As described, the present algorithm is only applicable to disk drive designs where the host transfer rate is always faster than the drive data rate. However, the present algorithm can be easily modified if the drive data rate exceeds the host transfer rate.

Figure 6:
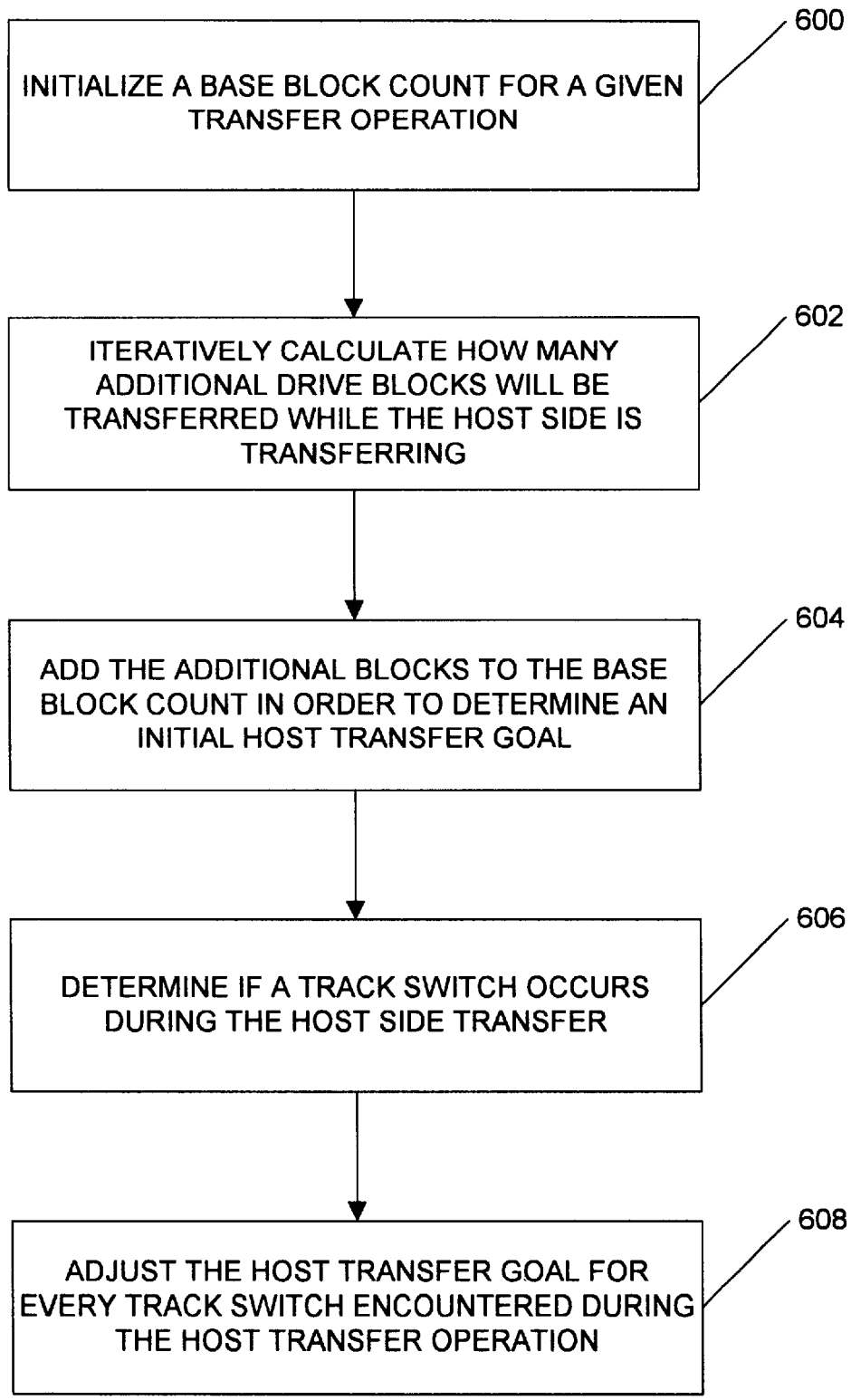
FIG. 6 illustrates a generalized method for establishing a transfer goal used in a dynamic buffer ratio adjustment algorithm in accordance with the present invention.

FIG. 6 illustrates a generalized method for establishing a transfer goal used in a dynamic buffer ratio adjustment algorithm. At block 600, the base block count is initialized for a given transfer operation. If the host side transfer cannot be completed in a single operation, the base block count is initialized to the size of the buffer minus the size of the pad. Otherwise, if the host side transfer can be completed in a single operation, the base block count is initialized to the remaining blocks in the transfer operation minus the number of drive blocks that will be transferred in the amount of time it takes the host side to complete the transfer for the current command.

At block 602, the method iteratively calculates how many additional drive blocks will be transferred while the host side is transferring. The number of blocks the drive side transfers while the base block count is being transferred by the host is computed by multiplying the base block count by the drive data rate inverse, then dividing the product by the host data rate inverse.

Next, at block 604, the method adds the additional drive blocks that were calculated in the previous step (i.e., block 602) to the base block count from step 600 to initially determine a host transfer goal. The initialization and calculation of the host transfer goal is described in much greater detail subsequently in FIGS. 7A–7B.

After the host transfer goal has been initially determined, the method next determines if one or more track switches has occurred during the host side transfer, as shown at block 606. Finally, at block 608, the host transfer goal is adjusted for every track switch encountered during the host transfer operation. The track adjustment operation is described in much greater detail subsequently in FIGS. 7C–7E.

Figure 7A:
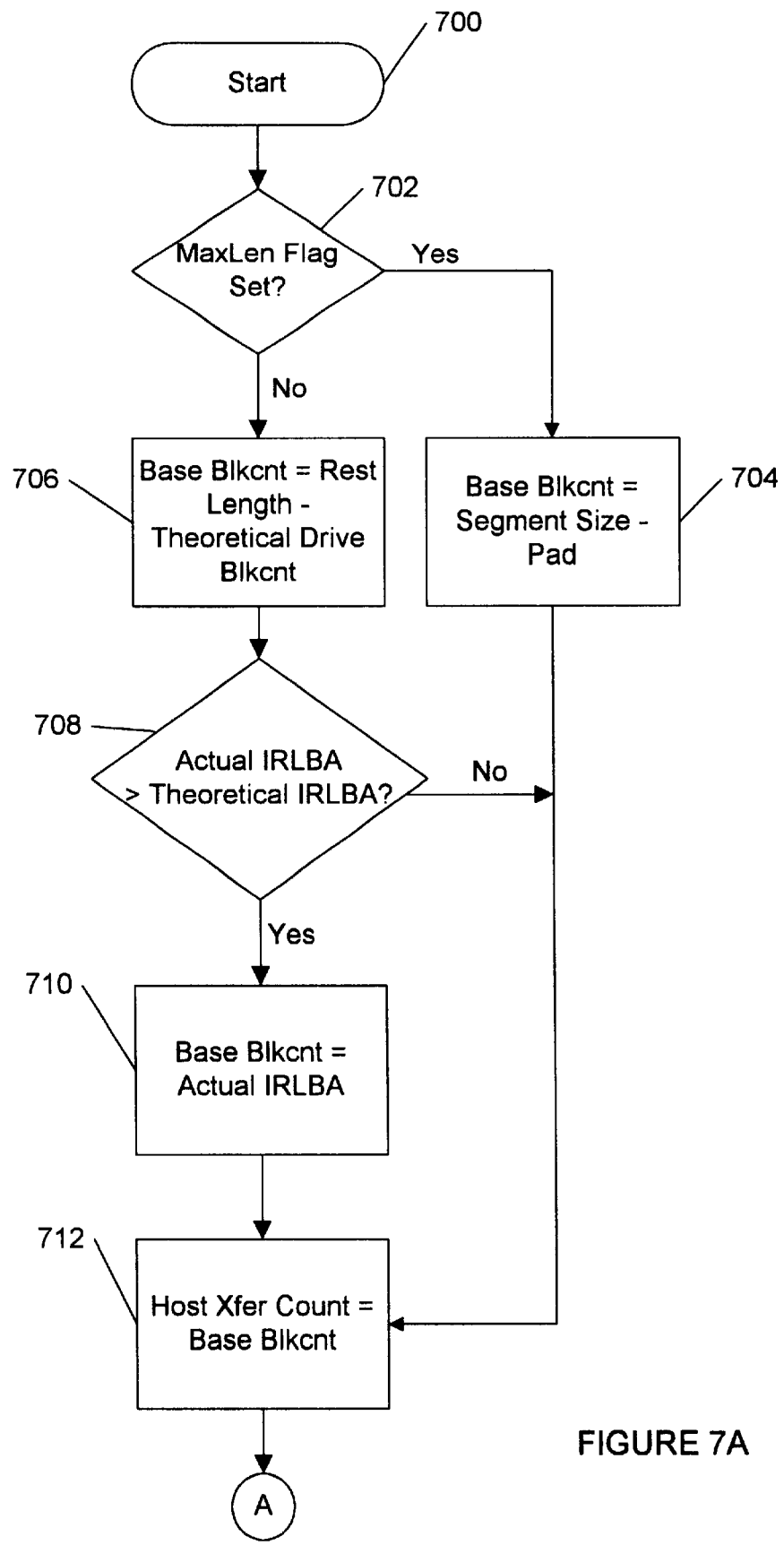
FIG. 7A is a detailed flow diagram describing the initialization for goal calculation portion of the method for establishing a transfer goal used in the dynamic buffer ratio adjustment algorithm.
Figure 7B:
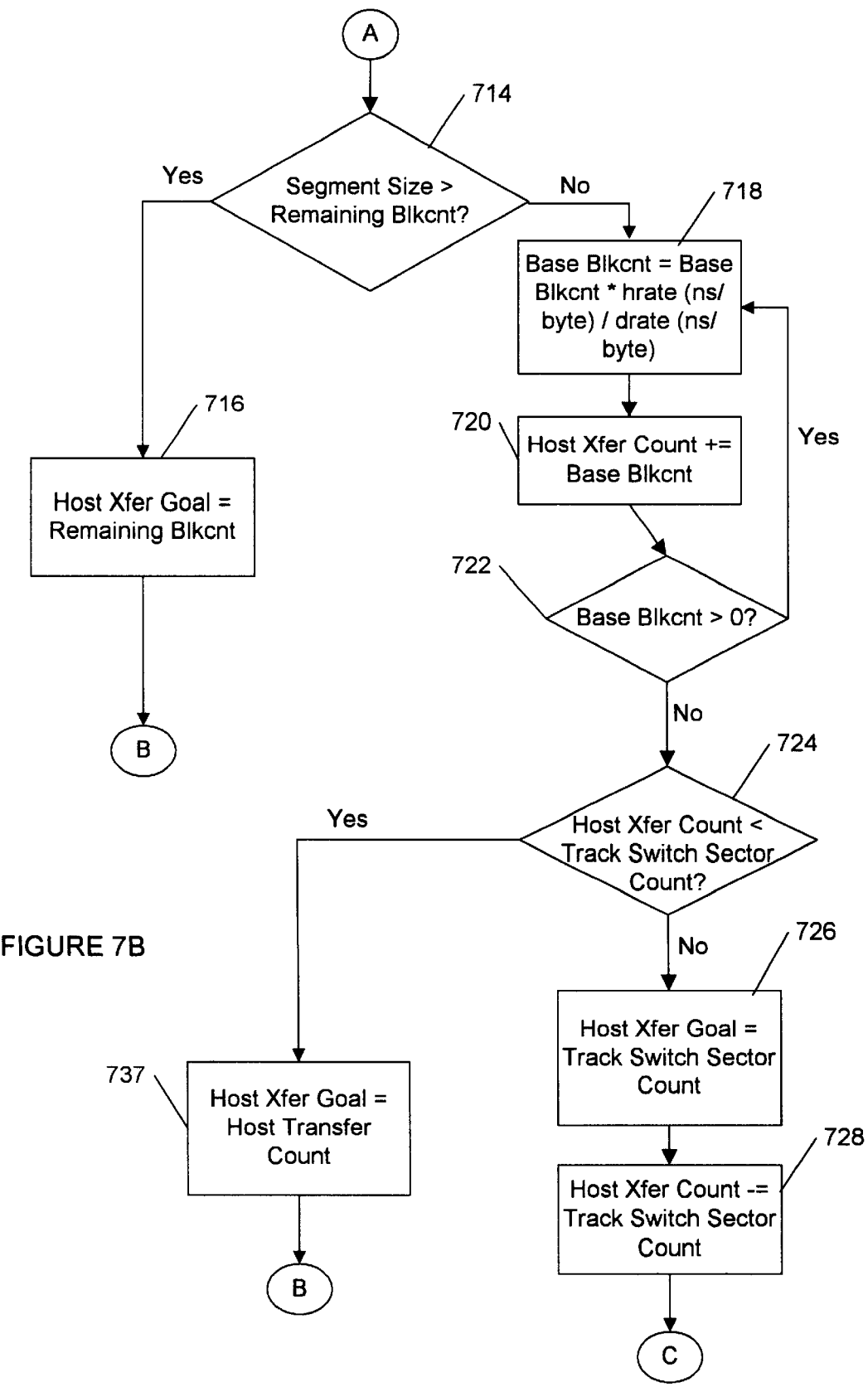
FIG. 7B is a detailed flow diagram describing the goal calculation portion of the method for establishing the transfer goal used in the dynamic buffer ratio adjustment algorithm.
Figure 7C:
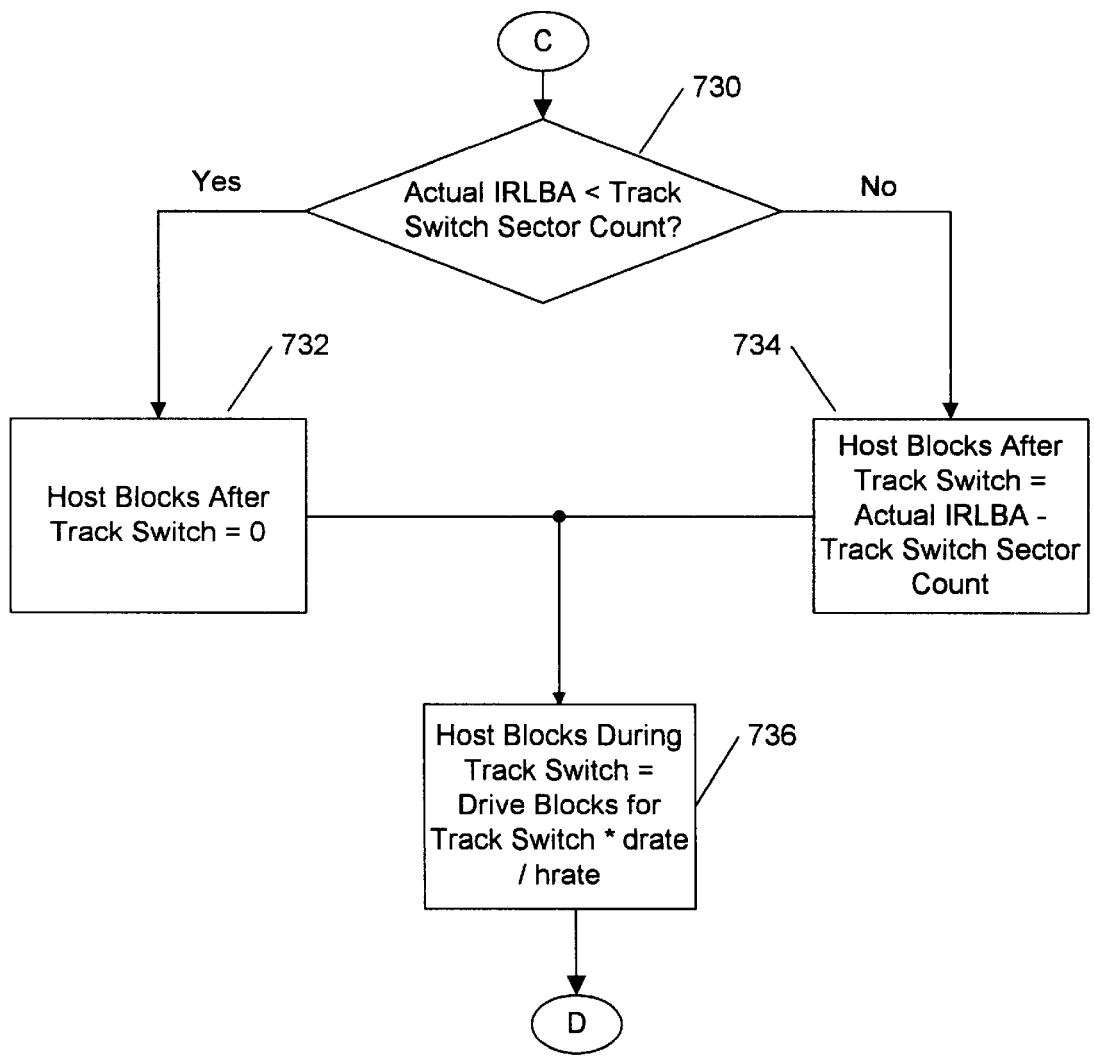
FIG. 7C is a detailed flow diagram describing the initialization for track adjustment section of the method for establishing the transfer goal used in the dynamic buffer ratio adjustment algorithm.

An exemplary method of the present invention is described in the primary logic flow illustrated in FIGS. 7A–7E. FIG. 7A generally illustrates the initialization for goal calculation steps of the method. FIG. 7B generally illustrates the goal calculation steps of the method. FIG. 7C generally illustrates the initialization for track adjustment steps of the method. Finally, FIGS. 7D and 7E collectively illustrate the track adjustment steps of the method.

Referring now to FIG. 7A, the method begins at block 700. At block 702, it is determined if the MaxLen flag is set. The MaxLen flag is set in an earlier code routine if the calculated theoretical IRLBA (Interrupt Logical Block Address) is greater than the current segment size (i.e., the block transfer cannot be completed in one operation). The theoretical IRLBA is the point where the host side is started in reference to the drive side to ensure that the remaining host transfer completes in one operation with a minimal delay. This is a calculation based on the current host transfer rate and the drive data rate for the current zone of the disk drive. Thus, if the MaxLen flag is set, the block transfer cannot be completed in one operation, and the actual IRLBA (i.e., the point where the host start will be automatically started when the drive side reaches this logical block address) is set at the current segment size (memory buffer size) less the pad setting to account for the amount of time needed to gain loop access. At this point, execution proceeds to block 704. If the MaxLen flag is not set (i.e., the block transfer can be completed in a single operation), the actual IRLBA is set to the theoretical IRLBA, plus any track switch adjustments, and execution then proceeds to block 706.

At block 706, the base block count (i.e., the total number of blocks that can be transferred at the current IRLBA setting) is initialized to the remaining blocks in the transfer minus the theoretical drive block count. The theoretical drive block count is how many drive blocks will be transferred in the amount of time it takes the host side to complete the transfer for the current command. The difference between the number of blocks remaining for the current command and the theoretical drive block count is typically the point where the actual IRLBA will be set (unless there is an adjustment made for a track switch) to allow the host side to finish its transfer in one operation.

Execution now proceeds to block 708, where it is determined if the actual IRLBA is greater than the theoretical IRLBA. In some cases, the actual IRLBA is adjusted after the theoretical IRLBA calculation to account for drive side delays due to a pending track switch. If the actual IRLBA is less than or equal to the theoretical IRLBA, control passes to block 712. If the actual IRLBA is greater than the theoretical IRLBA, control passes go to block 710, where the base block count is adjusted to the actual IRLBA to reflect the actual number of drive blocks that will be transferred when the host side is eventually started. Control then passes to block 712

Referring now to block 704, since the MaxLen flag is set, the actual IRLBA being used has been set to the segment size minus the current arbitration delay pad. If the pad has adjusted correctly, at least one segment of host data will be transferred before the next host catch-up condition. The base block count is initialized to the segment size. Control then passes to block 712.

At block 712, the host transfer count is set to the base block count (i.e., the number of blocks from the base address to the actual IRLBA). Regardless of what happens on the drive side, when the host side starts transferring data, there will always be memory available in the segment for this many blocks of data.

Referring now to FIG. 7B, at block 714, it is determined if the current segment size is greater than the remaining block count. In other words, this step is basically a boundary condition test that provides a shortcut to bypass the goal calculation algorithm if the remaining block count to transfer for this command is less than or equal to the current segment size. If this is the case, the host transfer goal is set to the remaining block count at block 716. Alternatively, if the current segment size is greater than the remaining block count, control passes to block 718.

Block 718 is the first step in a loop that determines how many blocks that the host side transfers in the next operation for the actual IRLBA setting (assuming no track switches). Once again, the actual IRLBA is the point where the host side will be automatically started when the drive side reaches this LBA. As the host side transfers this amount of data, the drive side continues transferring data to memory. As a result, it becomes necessary to determine how many blocks the drive side transfers as the host side proceeds with its own transfer. To determine this, the base block count (which has already been initialized for the current IRLBA setting) is multiplied by the drive data rate inverse (ns/byte) divided by the host data rate inverse (ns/byte). This formula is derived from the following equations:

(1) Host transfer time=host blocks*blocks-to-bytes conv. factor/host rate
(2) Drive transfer time=drive blocks*blocks-to-bytes conv. factor/drive rate
(3) host transfer time=drive transfer time
(4) host blocks*blocks-to-bytes conv. factor/host rate=drive blocks*blocks-to-bytes conv. factor drive rate
(5) host blocks/host rate=drive blocks/drive rate
(6) host blocks*host rate inverse (ns/byte)=drive blocks*drive rate inverse (ns/byte)
(7) host blocks*host rate inverse (ns/byte)/drive rate inverse (ns/byte)=drive blocks Assuming the drive side moves this many blocks while the host side completes the previous base block transfer, this amount of blocks will be available/free in the segment for additional host transfer. As a result, the base block count is updated to reflect this new amount of data for the host side to transfer.

At this point, execution proceeds to block 720, where the host transfer count is updated to include the updated base block count from block 718. The host transfer count serves as a cumulative count of the number of blocks the host side should be able to transfer in the next operation (where operation is considered to be a single host engine start to pause to complete cycle).

Next, execution proceeds to block 722, where it is determined if the base block count is greater than 0. If so, execution loops back to block 718 to calculate the new base block count. Since the host side is always faster than the drive side, eventually the quotient from the division in block 718 (the host data rate inverse) will become zero (i.e., the algorithm uses integer math where the remainder is not checked). As a result, the calculated host transfer count will be slightly smaller than the best case host transfer count that would be determined if floating point math were used. When the base block count eventually reaches 0, control passes to block 724.

At block 724, It is determined if the host transfer count is less than the track switch sector count. This step is a shortcut to bypass track switch adjustments to the goal if they are not needed. Thus, if the amount of host data expected to be transferred in the next operation is less than the number of sectors from the current drive location until the next track switch, the calculated host transfer count should be transferred in the next operation since there should be no drive side delays caused by a track switch (assuming no drive or server errors). As a result, if the host transfer count is less than the track switch sector count, execution passes to block 737, where the host transfer goal is set to the host transfer count, and the routine is exited. If the host transfer count is greater than the track switch sector count, execution passes to block 726.

Block 726 is reached if there are upcoming track switches that need to be accounted for. At a minimum, the host side should be able to transfer data up to the point where the track switch occurs. Thus, the host transfer goal is initially set to the track switch sector count. Execution then passes to block 728. At block 728, the number of sectors until the next track switch are subtracted from the host transfer count, and execution proceeds to block 730.

Proceeding now to FIG. 7C, block 730 marks the beginning of the initialization for track adjustment section of the method. The track switch adjustment section is responsible for adjusting the host transfer goal by factoring in drive transfer delays caused by track switches. At block 730, the actual IRLBA is compared with the track switch sector count. If the track switch occurs before the actual IRLBA setting, the delay caused by the track switch does not need to be taken into account, since the host side will not yet be running. In this instance, execution proceeds at block 734. If the track switch occurs after the actual IRLBA setting, the host blocks after track switch variable is set to zero at block 732, and execution continues at block 736.

At block 734, the host blocks after track switch variable is initialized to the difference between the actual IRLBA and the track switch location. The first track switch will not have to be factored into the host transfer goal adjustment, since the host side will not be running when the drive side pauses for the track switch. Execution now continues at block 736.

At block 736, a new variable, host blocks during track switch, is initialized. For each zone, the track switch delay is given in a count of drive sector times. This delay is converted from drive sector counts to host block counts. The host blocks during track switch variable is then initialized to the drive blocks for track switch multiplied by the drive data rate inverse (ns/byte) divided by the host transfer rate inverse (ns/byte). Execution then continues at block 738.

Figure 7D:
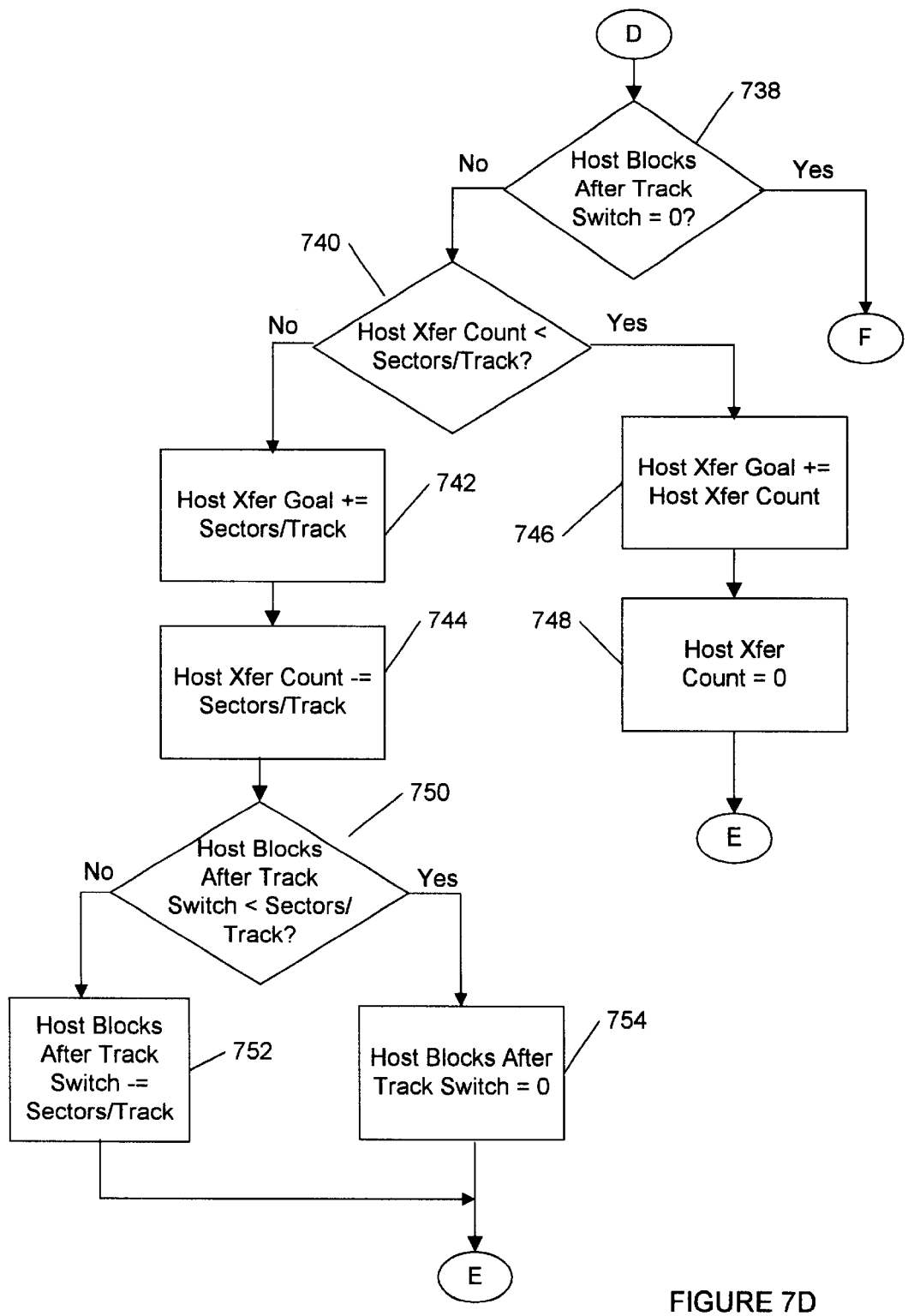
FIGS. 7D and 7E collectively illustrate a detailed flow diagram describing the track adjustment section of the method for establishing the transfer goal used in the dynamic buffer ratio adjustment algorithm.

Proceeding now to FIG. 7D, block 738 marks the beginning of the track adjustment section of the method. At block 738, it is determined if the host blocks after switch variable (which was previously set at blocks 732 and 734) is set to zero. If the variable is set to zero, control passes to block 758. If the variable is not set to zero, control passes to block 740.

At block 740, since the host blocks after track switch variable is non-zero, the actual IRLBA occurs after the first track switch. The host transfer goal does not need to be adjusted for this first track switch. Test whether the remaining host transfer count is less than the number of sectors per track for this zone. If the count is less control passes to block 746, otherwise if the count is greater than or equal to the number of sectors per track, control passes to block 742.

At block 742, since the remaining host transfer count is greater than or equal to the number of sectors per track for this zone, the adjustment algorithm will need to adjust for another track switch. However, since there should be no drive side delays during normal on-track operations, the host transfer goal is incremented by the number of sectors per track. Next, at block 744, the remaining host transfer count is decremented by the number of sectors per track for this zone. Control then passes to block 750.

At block 750, the host blocks after track switch variable is tested to determine if it is less than the number of sectors per track for the current zone. If so, control passes to block 754. If the host blocks after track switch variable is greater than or equal to the number of sectors per track for the current zone, control passes to block 752.

At block 752, since the host blocks after track switch is greater than or equal to the number of sectors per track, the actual IRLBA is set sometime after the next track switch. The host blocks after track switch variable is decremented by the number of sectors per track for the current zone. Control then passes to block 756.

At block 754, since the host blocks after track switch variable is less than the number of sectors per track, the actual IRLBA will occur sometime on this track. As a result the track switch at the end of this track will have to be accounted for in adjusting the host transfer goal. The host blocks after track switch variable is set to zero. Control then passes to block 756.

At block 746, since the remaining host transfer count is less than the number of sectors per track for this zone, the actual IRLBA was set after the first track switch and the remaining transfer will complete before the second track switch is reached. If the actual IRLBA has been properly set, this remaining data transfer should complete in the next operation and no track switch adjustments to the goal should be needed. As a result, the host transfer goal is incremented by the remaining host transfer count, and control passes to block 748. At block 748, since the end of the operation has been reached, the remaining host transfer count is set to zero, and control passes to block 756.

Figure 7E:
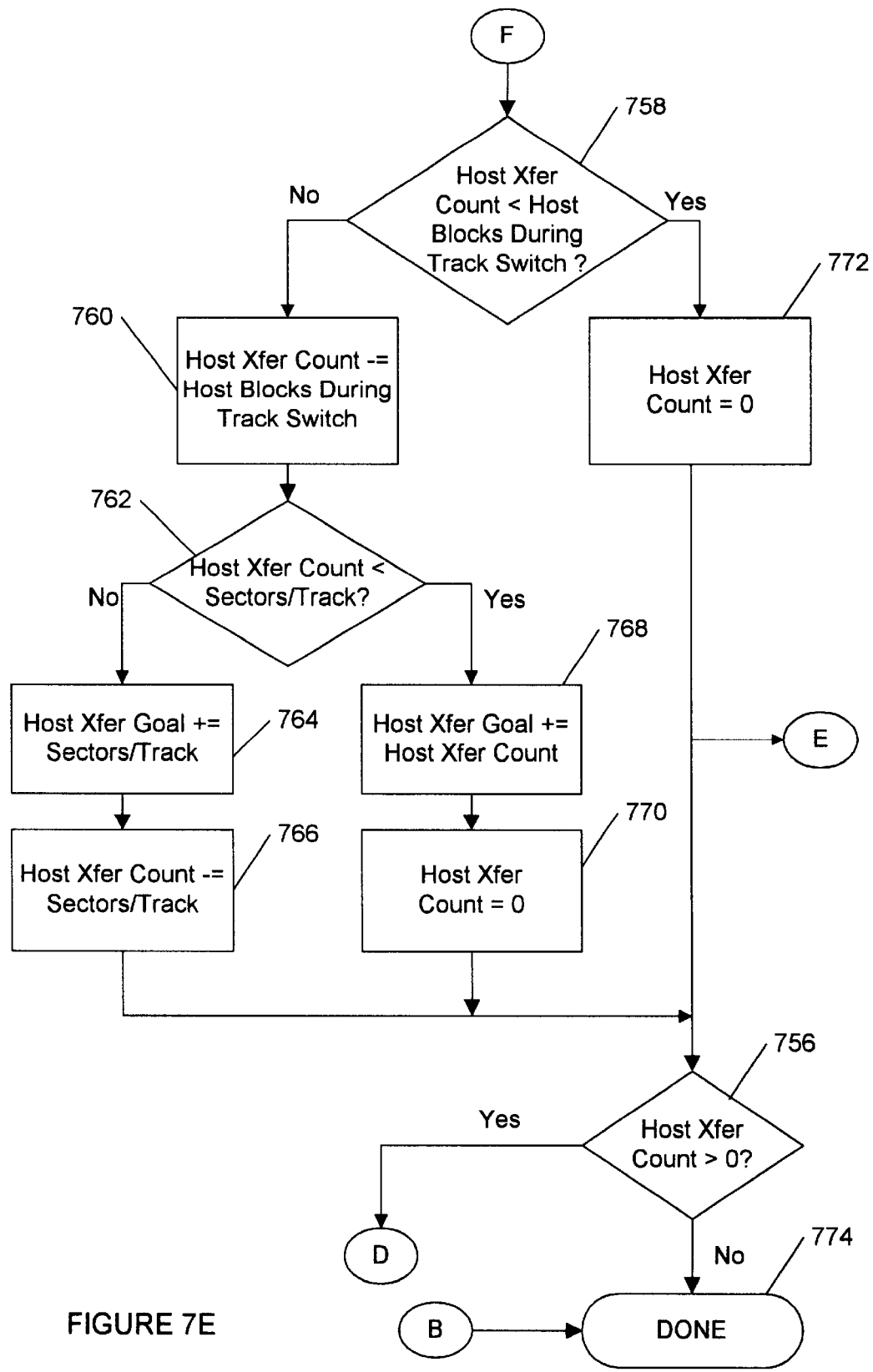

Moving now to FIG. 7E, since the value of the host blocks after track switch variable is zero, the actual IRLBA occurs before the first track switch (as shown at block 758). In this case, the host transfer goal must be adjusted for all remaining track switches. The host transfer count is tested to determine if its value is less than the host blocks during track switch variable. If it is, the host catch-up will occur while the drive side is in the middle of the track switch and the goal should only include blocks before the track switch. Control then passes to block 772, where the host transfer count is set to zero in order to exit the track adjustment loop. Control then passes to 756.

At block 760, since the host transfer count is greater than the host blocks during track switch variable, the next host catch-up condition will occur sometime after the current track switch. As a result, the host transfer count is decremented by the delay caused by the track switch. Adjusting the host transfer count without incrementing the host transfer goal effectively factors in the track switch delay into the goal setting. Control next passes to block 762.

At block 762, it is determined whether the host transfer count will finish on the next track (i.e., is the host transfer count less that the number of sectors per track for the current zone). If not, control passes to block 764. Under this condition, the entire track should be transferred before the next host catch-up condition. The host transfer goal is incremented by the number of sectors per track for this zone, and control passes to block 766.

At block 766, the host transfer count is decremented by the number of sectors per track for this zone. Thus, the next track switch needs to be accounted for prior to incrementing the host transfer goal again. Control next passes to block 756.

At block 768, since the host transfer count is less than the number of sectors per track for this zone, the next host catch-up condition is expected to occur sometime on this track. As a result, the host transfer goal is incremented by the host transfer count. Control then passes to block 770.

At block 770, the host transfer goal has been adjusted to account for track switches for the entire expected host transfer (i.e., the end of the expected host transfer has been reached). As a result, the host transfer count is set to zero in order to exit the track adjustment loop.

At block 772, since the host transfer count is less than host blocks during track switch variable, the next host catch-up is expected to occur sometime during this track switch. Thus, the host transfer goal is not incremented beyond this track switch location. The host transfer count is then set to zero in order to exit the track adjustment loop.

At block 756, the host transfer count is examined to see if it is greater than zero. If it is, 20 there are still blocks that are expected to be transferred in the next operation, so control passes back to block 738 to continue processing these blocks for track switch adjustments. Alternatively, if the host transfer count is zero, the host transfer goal has been adjusted for track switches for all blocks in the next expected transfer. Since the adjustments are complete, the final host transfer goal has been set, and the method is exited at block 774.

While the foregoing is directed to the preferred embodiment of the present invention, other and further embodiments of the invention may be devised without departing from the basic scope thereof, and the scope thereof is determined by the claims that follow.

What is claimed is:

1. A method for dynamically adjusting buffer utilization ratios for a hard disk drive system, comprising:
    establishing and dynamically adjusting a transfer goal for the amount of data transferred between host catch-up conditions for a current command, the goal being established by a plurality of operational characteristics, the operational characteristics comprising: drive transfer speed, host transfer speed and track switch locations, comprising the steps of:
        initializing a base block count for a transfer operation for the current command, comprising the steps of:
            initializing the base block count to the size of the buffer less the size of the pad, if the host side transfer cannot be completed in a single operation; and
            initializing the base block count to the remaining blocks in the transfer operation minus the number of drive blocks that will be transferred in the amount of time it takes the host side to complete the transfer for the current command, if the host side transfer can be completed in a single operation;
        iteratively calculating how many additional drive blocks are transferred while the host side is transferring;
        establishing the transfer goal from the base block count and the cumulative total of additional drive blocks that are transferred while the host side is transferring;
        determining if a track switch occurs during the host side transfer; and
        adjusting the transfer goal for every track switch encountered during the transfer operation;
    comparing an actual amount of data transferred between host catch-up conditions against the transfer goal for the current command; and
    adjusting the buffer utilization ratios when the actual amount of transferred data does not exceed the transfer goal.

2. The method of claim 1, wherein the step of iteratively calculating how many additional drive blocks are transferred while the host side is transferring comprises the steps of:
    exiting the iterative calculation step if the number of remaining blocks in the transfer operation is less than the buffer size; initializing a host transfer count to the base block count; and
    while the base block count is greater than zero, looping on the following steps:
        calculating how many blocks the drive side will transfer while the base block count is being transferred by the host;
        incrementing the host transfer count by the number of blocks transferred by the drive side while the base block count is being transferred by the host; and
        setting the base block count to the number of blocks transferred by the drive side while the base block count is being transferred by the host.

3. The method of claim 2, wherein the step of calculating how many blocks the drive side will transfer while the base block count is being transferred by the host comprises the step of:
    multiplying the base block count by the drive data rate inverse, then dividing the product by the host data rate inverse.

4. A computer readable medium storing a software program that, when executed by a processor, causes the processor to perform a method for dynamically adjusting buffer utilization ratios for a hard disk drive system, comprising:
    establishing and dynamically adjusting a transfer goal for the amount of data transferred between host catch-up conditions for a current command, the goal being established by a plurality of operational characteristics, the operational characteristics comprising: drive transfer speed, host transfer speed and track switch locations, comprising the steps of:

initializing a base block count for a transfer operation for the current command, comprising the steps of:

initializing the base block count to the size of the buffer less the size of the pad, if the host side transfer cannot be completed in a single operation; and initializing the base block count to the remaining blocks in the transfer operation minus the number of drive blocks that will be transferred in the amount of time it takes the host side to complete the transfer for the current command, if the host side transfer can be completed in a single operation;

iteratively calculating how many additional drive blocks are transferred while the host side is transferring;

establishing the transfer goal from the base block count and the cumulative total of additional drive blocks that are transferred while the host side is transferring;

determining if a track switch occurs during the host side transfer; and adjusting the transfer goal for every track switch encountered during the transfer operation;

comparing an actual amount of data transferred between host catch-up conditions against the transfer goal for the current command; and adjusting the buffer utilization ratios when the actual amount of transferred data does not exceed the transfer goal.

5. The computer readable medium of claim 4, wherein the step of iteratively calculating how many additional drive blocks are transferred while the host side is transferring comprises the steps of:

exiting the iterative calculation step if the number of remaining blocks in the transfer operation is less than the buffer size;

initializing a host transfer count to the base block count; and while the base block count is greater than zero, looping on the following steps:

calculating how many blocks the drive side will transfer while the base block count is being transferred by the host;

incrementing the host transfer count by the number of blocks transferred by the drive side while the base block count is being transferred by the host; and setting the base block count to the number of blocks transferred by the drive side while the base block count is being transferred by the host.

6. The computer readable medium of claim 5, wherein the step of calculating how many blocks the drive side will transfer while the base block count is being transferred by the host comprises the step of:

multiplying the base block count by the drive data rate inverse, then dividing the product by the host data rate inverse.

* * * * *